United States Patent [19]

Saegusa

[11] Patent Number: 5,736,111
[45] Date of Patent: Apr. 7, 1998

[54] METHOD FOR PRODUCING IRON-CONTAINING COMPLEX OXIDE POWDERS

[75] Inventor: Kunio Saegusa, Ibaraki, Japan

[73] Assignee: Sumitomo Chemical Company, Limited, Osaka, Japan

[21] Appl. No.: 687,970

[22] Filed: Jul. 29, 1996

[30] Foreign Application Priority Data

Jul. 31, 1995 [JP] Japan .................. 7-215410

[51] Int. Cl.$^6$ .................. C01G 49/00
[52] U.S. Cl. .................. 423/594
[58] Field of Search .................. 423/625, 594

[56] References Cited

U.S. PATENT DOCUMENTS 5,538,709 7/1996 Mohri et al. .................. 423/625

FOREIGN PATENT DOCUMENTS 5-81531 11/1993 Japan.
6-16449 3/1994 Japan.

OTHER PUBLICATIONS

B. T. Shirk et al., "Magnetic Properties of Barium Ferrite Formed by Crystallization of a Glass", *Journal of The American Ceramic Society—Shirk and Buessem*, vol. 53, No. 4, Apr. 1970, pp. 192–196.

*Primary Examiner*—Ferris Lander
*Attorney, Agent, or Firm*—Sughrue, Mion, Zinn, Macpeak & Seas, PLLC

[57] ABSTRACT

A method for producing an iron-containing complex oxide powder represented by the general formula:

$$XO \cdot nFe_2O_3$$

wherein X represents one or more elements selected from the group consisting of Pb, Mg, Ca, Sr, Ba, Zn, Cu, Mn, Fe, Co and Ni and n represents an integer of 1 to 6, which comprises heating a mixture of an oxide of an X atom and iron oxide, or a mixture of a compound of the X atom and a compound of iron, which can be converted into the oxides, in an atmosphere gas containing at least one gas selected from a bromine gas, an iodine gas, a hydrogen bromide gas and a hydrogen iodide gas.

6 Claims, 2 Drawing Sheets

AN X-RAY POWDER DIFFRACTION PATTERN OF POWDER OBTAINED IN EXAMPLE 1.

1

METHOD FOR PRODUCING IRON-CONTAINING COMPLEX OXIDE POWDERS

BACKGROUND OF THE INVENTION

1. Field of the Invention

The present invention relates to a method for producing an iron-containing complex oxide powder. More particularly, it relates to a method for producing an iron-containing complex oxide powder which is useful as a powdery material for an oxide ceramic as a functional material, a metal oxide powder to be used in a dispersed state such as a filler, pigment and the like or a metal oxide powder to be used as a powdery material for producing a single crystal, a powdery material for thermal spraying and the like.

2. Background Information

Heretofore, various ferrite materials have been known and have been used as a magnetic tape for recording sounds and images, a magnet, a magnetic material for recording informations and the like. For example, magnetoplumbite type iron-containing complex oxide powders (hereinafter merely referred to as a magnetoplumbite type oxide powder, sometimes) such as barium ferrite, strontium ferrite and the like has been used as a vertical magnetic recording material because of its flat shape and magnetic characteristics.

It is difficult to produce these magnetoplumbite type oxide powders and are produced only by special production means such as glass crystallization method comprising melting powder such as oxide, carbonate and the like at high temperature, quenching the molten material to form glass, heating the glass to crystallize a magnetoplumbite type oxide, dissolving a glass component to recover a crystal powder, hydrothermal synthesis method comprising reacting a powdery material under high-temperature and high-pressure hydrothermal conditions and the like. They could not be produced by a normal solid phase method due to mixing/calcining a powdery material, co-precipitation method due to the solution reaction in an aqueous solution and the like. Also, it was difficult to precisely control the particle size of the product.

When the magnetoplumbite type oxide powder is utilized in a dispersed state like a filler for magnetic recording, characteristics of the respective particles are directly reflected. Therefore, it is very important to control characteristics such as particle size of the powder. Required characteristics vary with the kind and utilization form and examples of common characteristics include uniform particle size of particles of powders (i.e. narrow particle size distribution) and weak bonding force among primary particles (i.e. less agglomerates and good dispersion properties). As the method for producing a complex metal oxide powder containing two or more metal elements, there has hitherto been known a method of calcining a mixed powder of the metal oxide corresponding to the composition of the product in air or an inert gas. In the conventional method, however, it is difficult to obtain a single phase of the complex metal oxide which is the desired compound of two or more metal elements and oxygen. In order to obtain the single phase of the complex metal oxide, it is necessary to calcine at high temperature or conduct a plurality of calcination and pulverization steps. Therefore, it was not an industrially efficient method.

Also, a method for calcining a metal oxide precursor powder containing two or more metal elements in air or an inert gas is known as a liquid phase method. In the liquid phase method, for example, precipitation method, co-precipitation method, hydrolysis method and the like, a precursor powder such as hydrate of the metal oxide was produced from a metal salt in water or organic solvent as a starting material. Then, the precursor powder was calcined to produce the metal oxide powder containing two or more metal elements [W. S. Gallahher et al., J. Res. Nat. Bur. of Stand., 56, 289 (1956)].

In the above described liquid phase method for producing the metal oxide powder using the metal oxide mixed powder or metal oxide precursor powder obtained by the liquid phase method as the raw material, it is necessary to calcine the material in an atmosphere containing oxygen, nitrogen, an inert gas atmosphere, an atmosphere containing hydrogen or the like. The metal oxide powder produced by such a process had a strong bonding force among primary particles and was strongly agglomerative. Therefore, a pulverizing step after the calcining treatment was essential. In this pulverizing step, however, complete cleavage of the bonding among primary particles was difficult and a problem remained that the distribution of particle size was broad. Another problem was unavoidable contamination of the product caused by pulverization means.

A method of adding a flux component to a mixed powder of the metal oxide and calcining the mixed powder is generally known. However, this method has a problem that a pulverizing step and a step of removing the flux component are required because adhesion of the flux component arises after calcining and that the flux component is remained in the metal oxide as the product [B. T. Shrink et al., J. Am. Cer. Soc. Vol.53 (4). 192–96 (1970)]. On the other hand, a method for producing a metal oxide powder containing two or more metal elements according to a hydrothermal synthesis method is known. However, high temperature and high pressure are required as the reaction condition and, also, it is difficult to produce in an industrially advantageous rate [K. Abe et al., Ceramic Powder Science IV, American Ceramic Soc. 15–25 (1991)].

A vapor phase reaction method of producing a metal oxide powder by a chemical reaction of a metal vapor or a metal compound in vapor phase is known as the method for producing the metal oxide powder. According to the method, fine powders of the metal oxide having a narrow particle size distribution and containing less agglomerates are obtained. However, the method has a problem that the step of producing particles is complicated and particle size and particle size distribution are difficult to be controlled and that the apparatus factor has a great influence. Furthermore, the method was not industrially suited for the method for producing a complex metal oxide having a complex composition.

There has been known a method of adding a seed crystal to the metal oxide powder or metal oxide precursor powder as the raw material and calcining the material in an atmosphere containing oxygen, nitrogen, an inert gas atmosphere, an atmosphere containing hydrogen or the like, in order to control the particle size of the metal oxide powder or to produce the metal oxide powder having a narrow particle size distribution. However, it is difficult to produce a complex metal oxide powder by the above method. If the powder can be produced, the obtained powder becomes strongly agglomerative. Therefore, a pulverizing step after the calcining treatment was essential. In this pulverizing step, however, complete cleavage of the bonding among primary particles was difficult and a problem remained that the distribution of particle size was broad. Another problem was unavoidable contamination of the product caused by pulverization means.

It has never been reported that a metal oxide powder was produced by heating a metal powder in an atmosphere other than an atmosphere containing oxygen, nitrogen and an inert atmosphere. On the other hand, for a metal oxide which is a compound between a single metal element and oxygen, a result obtained by sintering a molded metal oxide in an atmosphere containing hydrogen chloride was reported in J. Am. Ceream. Soc., 69, 580 (1986) and ibid., 70, C-358 (1987).

The former described a behavior of zirconium oxide on sintering in an atmosphere of hydrogen chloride and the latter did a behavior of titanium oxide on sintering. In the latter, a molded metal oxide was sintered at 1000° C.–1300° C. in an atmosphere of hydrogen chloride to allow formation of a porous substance by growth of particles caused by an extremely rapid growth of necks between grains and movements of grain boundaries inhibiting shrinkage.

After extensive researches for seeking a method, having no such problems, for producing an iron-containing complex metal oxide powder with less agglomerated particles and narrow particle size distribution, the present inventors have found that the iron-containing complex metal oxide powder with less agglomerated particles and narrow particle size distribution can be produced by heating a compound as the raw material in an atmosphere gas containing at least one gas selected from bromine gas, iodine gas, hydrogen bromide gas and hydrogen iodide gas, and thus have completed the present invention.

SUMMARY OF THE INVENTION

The present invention provides a method for producing an iron-containing complex oxide powder represented by the general formula:

$$XO \cdot nFe_2O_3$$

wherein X represents one or more elements selected from the group consisting of Pb, Mg, Ca, Sr, Ba, Zn, Cu, Mn, Fe, Co and Ni and n represents an integer of 1 to 6, which comprises heating a mixture of an oxide of a X atom and iron oxide, or a mixture of a compound of the X atom and a compound of iron, which can be converted into the oxides, in an atmosphere gas containing at least one gas selected from a bromine gas, an iodine gas, a hydrogen bromide gas and a hydrogen iodide gas.

DETAILED DESCRIPTION OF THE INVENTION

Figure 1:
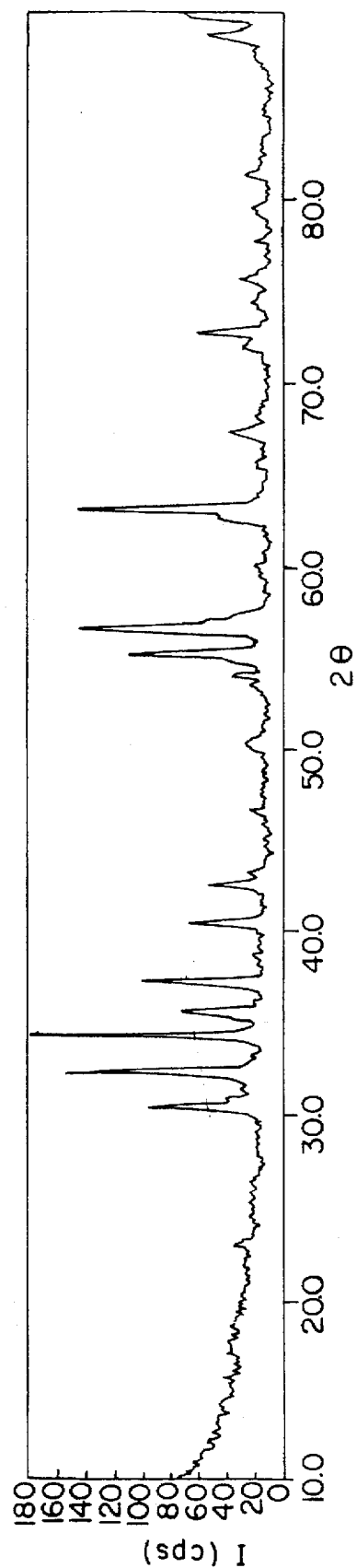
FIG. 1 is an X-ray powder diffraction pattern of powder obtained in Example 1.

The present invention will be described below in more detail.

The iron-containing complex metal oxide produced by the method of the present invention refers to an iron-containing complex oxide powder represented by the general formula:

$$XO \cdot nFe_2O_3$$

wherein X represents one or more elements selected from the group consisting of Pb, Mg, Ca, Sr, Ba, Zn, Cu, Mn, Fe, Co and Ni and n represents an integer of 1 to 6, or solid solutions thereof. In the iron-containing complex oxide powder represented by the general formula $XO \cdot nFe_2O_3$, an iron-containing complex oxide powder wherein n is 1 or 6 is preferred in view of practical use.

Specific examples of the iron-containing complex oxide powder represented by the general formula $XO \cdot nFe_2O_3$ include one, two or more kinds of oxides selected from magnetoplumbite type oxides represented by $BaFe_{12}O_{19}$, $PbFe_{12}O_{19}$, $CaFe_{12}O_{19}$ and $SrFe_{12}O_{19}$, or solid solutions thereof.

Specific examples of the iron-containing complex oxide powder represented by the general formula $XO \cdot nFe_2O_3$ include one, two or more kinds of oxides selected from spinel type oxides represented by $ZnFe_2O_4$, $CuFe_2O_4$, $MnFe_2O_4$, $CoFe_2O_4$ and $NiFe_2O_4$, or solid solutions thereof.

The present invention discloses a method for producing an iron-containing complex oxide powder, which comprises heating a mixture of an oxide of an X atom and iron oxide or a mixture of a compound of the X atom and a compound of iron, which can be converted into the oxides, in an atmosphere gas containing a bromine gas, an iodine gas, a hydrogen bromide gas or a hydrogen iodide gas.

In the present invention, it is preferred to mix compounds as the raw material so as to obtain a molar ratio of an X atom to an iron atom contained in the general formula $XO \cdot nFe_2O_3$.

Hereinafter, the compound of the X atom which can be converted into the oxide of X and the compound of iron which can be converted into the iron oxide are sometimes referred to as a metal oxide precursor.

Examples of the raw material used in the present invention include mixture of oxides of one, two or more kinds of atoms selected from the group consisting of Pb, Mg, Ca, Sr, Ba, Zn, Cu, Mn, Fe, Co and Ni and an iron oxide, and/or mixture of these metal oxide precursors. It is also possible to use a mixture of a metal oxide precursor of an X atom and an iron oxide, or a mixture of an oxide of the X atom and the metal oxide precursor of iron, as the raw material.

The metal oxide precursor used as the raw material in the present invention refers to one which produces a metal oxide of one, two or more kinds of metal elements and oxygen by decomposing reaction, oxidizing reaction and the like due to calcination. Specific examples thereof include metal hydroxide, metal oxalate, metal nitrate, metal sulfate, metal acetate and the like.

Examples of the metal oxide precursor of the X atom used in the present invention include lead compounds such as lead hydroxide, lead oxalate, lead nitrate, lead sulfate, lead acetate and the like; magnesium compounds such as magnesium hydroxide, magnesium oxalate, magnesium nitrate, magnesium sulfate, magnesium acetate and the like; calcium compounds such as calcium hydroxide, calcium oxalate, calcium nitrate, calcium sulfate, calcium acetate and the like; strontium compounds such as strontium hydroxide, strontium oxalate, strontium nitrate, strontium sulfate, strontium acetate and the like; barium compounds such as barium hydroxide, barium oxalate, barium nitrate, barium sulfate, barium acetate and the like; zinc compounds such as zinc hydroxide, zinc oxalate, zinc nitrate, zinc sulfate, zinc acetate and the like; copper compounds such as copper hydroxide, copper oxalate, copper nitrate, copper sulfate, copper acetate and the like; manganese compounds such as manganese hydroxide, manganese oxalate, manganese nitrate, manganese sulfate, manganese acetate and the like; iron compounds such as iron hydroxide, iron oxalate, iron nitrate, iron sulfate, iron acetate and the like; cobalt compounds such as cobalt hydroxide, cobalt oxalate, cobalt nitrate, cobalt sulfate, cobalt acetate and the like; and nickel compounds such as nickel hydroxide, nickel oxalate, nickel sulfate, nickel acetate and the like.

Examples of the metal oxide precursor of iron used in the present invention include iron compounds such as iron hydroxide, iron oxalate, iron nitrate, iron sulfate, iron acetate and the like.

In the present invention, a seed crystal can be added. The seed crystal means one which can be a nuclear for the crystal growth of the metal oxide, and the metal oxide grows around the seed crystal as the nuclear. The seed crystal may be any one having this function. When the product is a complex metal oxide which is a compound of two or more metal elements and oxygen, or a metal oxide solid solution of two or more metal elements and oxygen, it is preferred to add the complex metal oxide and metal oxide solid solution, which are products, as the seed crystal.

The method for adding the seed crystal to the powdery material is not specifically limited, for example, a mixing method such as ball mill, ultrasonic dispersion and the like can be used.

Mixed powder of metal oxide powder and/or metal oxide precursor powder, and metal oxide precursor powder containing two or more metals as a raw material and, further, powders prepared by adding the seed crystal to the raw materials are sometimes referred to as a metal oxide powder as the raw material.

In the present invention, the metal oxide powder as the raw material may be one produced by the conventional process and is not specifically limited. For example, the metal oxide powder or metal oxide precursor powder produced by the liquid phase method, or the metal oxide powder produced by the vapor or solid phase method can be used.

In the present invention, the metal oxide powder as the raw material is calcined by heating in an atmosphere gas containing at least one gas selected from bromine gas, iodine gas, hydrogen bromide gas and hydrogen iodide gas. A mixed gas of these gases can also be used.

The atmosphere gas is a gas containing preferably 1% by volume or more and 99% by volume or less, more preferably 5% by volume or more and 90% by volume or less, further preferably 10% by volume or more and 90% by volume or less of at least one gas selected from bromine gas, iodine gas, hydrogen bromide gas and hydrogen iodide gas, based on the total volume of the atmosphere gas.

As a dilution gas for at least one gas selected from bromine gas, iodine gas, hydrogen bromide gas and hydrogen iodide gas, an inert gas such as nitrogen, argon and the like or water vapor, hydrogen or air can be used. The pressure of the atmosphere gas is not specifically limited and may optionally be selected within a range which can be industrially used.

In the present invention, source and method for supplying at least one gas selected from bromine gas, iodine gas, hydrogen bromide gas and hydrogen iodide gas and the dilution gas are not specifically limited and may be any one which enables introduction of the atmosphere gas into the reaction system containing the raw metal oxide powder.

For example, generally cylinder gases may be used as the source for at least one gas selected from bromine gas, iodine gas, hydrogen bromide gas and hydrogen iodide gas and the dilution gas. Alternatively, the atmosphere gas containing an iodine compound such as ammonium iodide and the like or hydrogen iodide, iodine and the like may be prepared. The atmosphere gas may be prepared by calcining a mixture of the metal oxide powder as the raw material and an iodine compound or an iodine-containing high molecular compound in a calcining furnace.

When a decomposition gas such as ammonium bromide, ammonium iodide and the like is used, precipitation of a solid material in the calcining furnace may cause a trouble in operation. Therefore, it is preferred to supply at least one gas selected from bromine gas, iodine gas, hydrogen bromide gas and hydrogen iodide gas and the dilution gas directly from a cylinder or the like into a calcining furnace. The atmosphere gas may be supplied continuously or batchwise.

According to the present invention, a complex oxide grows due to a function between the metal oxide powder as the raw material and atmosphere gas by calcining the metal oxide powder as the raw material in the atmosphere gas, thereby obtaining a complex oxide powder which is non-agglomerative and has a narrow particle size distribution. Accordingly, the desired complex oxide powder can be obtained only by charging the metal oxide powder as the raw material in a vessel, followed by calcining in the atmosphere gas. The metal oxide powder as the raw material used in the present invention may be a conventional powder, and the bulk density to the theoretical density is preferably 40% or less. When calcining the molded material whose bulk density to the theoretical density exceeds 40%, the sintering reaction proceeds in the process of calcining. Therefore, the molded material must be pulverized so as to obtain a metal oxide powder.

The calcining temperature depends on the kind of desired metal oxide, the concentration of at least one gas selected from bromine gas, iodine gas, hydrogen bromide gas and hydrogen iodide gas in the atmosphere gas and the heating time, so the calcining temperature is not specifically limited. The calcining temperature is preferably 500° C. or more and 1500° C. or less, more preferably 600° C. or more and 1400° C. or less. When the calcining temperature is lower than 500° C., it becomes difficult to obtain the desired complex oxide or metal oxide solid solution which is a compound of two or more metal elements and oxygen, and the heating may require a longer time. On the other hand, when the calcining temperature exceeds 1500° C., the produced metal oxide powder may contain many agglomerates.

The calcining time depends on the kind of the desired metal oxide, the concentration of at least one gas selected from bromine gas, iodine gas, hydrogen bromide gas and hydrogen iodide gas in the atmosphere gas, so the calcining time is not specifically limited. The time is preferably a minute or longer, more preferably 10 minutes or longer and selected within a range of time in which the desired metal oxide is obtained. As the calcining temperature rises, the calcining time is shortened.

When calcining the metal oxide powder as the raw material prepared by adding the seed crystal to the powdery material, the metal oxide grows around the seed crystal as the nuclear. Therefore, it is possible to decrease the calcining temperature and shorten the calcining time in comparison with the case using no seed crystal.

The calcining apparatus is not limited and may be a conventional calcining apparatus. Preferably, the calcining apparatus is made of a material which is not corroded by the bromine gas, iodine gas, hydrogen bromide gas and hydrogen iodide gas and has a mechanism for adjusting the atmosphere.

Further, since acidic gas such as bromine gas, iodine gas, hydrogen bromide gas, hydrogen iodide gas or the like is used, the calcining furnace is preferably airtight. From the industrial view point, the calcining is preferably effected by continuous manner and can use a tunnel furnace, a rotary kiln, a pusher furnace or the like.

Since the reaction proceeds in an acidic atmosphere, a vessel for containing the metal oxide powder as the raw material or the like used in the calcining step is preferably a crucible, boat or the like made of alumina, quartz, acid-resistant brick, graphite or a noble metal such as platinum and the like.

It is possible to control the particle size and particle size distribution of the iron-containing complex oxide powder as the product by changing the kind, particle size and amount of the seed crystal added. For example, the particle size of the produced iron-containing complex oxide powder can be decreased by increasing the amount of the seed crystal added. Using the seed crystal having a small particle size, the particle size of the produced iron-containing complex oxide powder can be decreased by increasing the amount of the seed crystal.

According to the above-mentioned method, there can be obtained a non-agglomerative and highly crystalline iron-containing complex oxide powder having an uniform particle size. It is also possible to control the particle size by adding the seed crystal. It is also possible to obtain a single crystal particle which is a polyhedron having an uniform particle size and shape.

While the particles may be agglomerates or may contain agglomerates depending on the raw material used or conditions for production, the agglomeration is weak and the agglomerates can be easily converted into metal oxide powders without agglomeration by subjecting to a simple grinding with, for example, a jet mill.

While the iron-containing complex oxide powder which is a compound of two or more metal elements and oxygen may contain a by-product or unreacted material oxide as the raw material in addition to the desired product depending on the raw material used or conditions for production, the amount of the remained by-product or unreacted material oxide is small and can be removed by separation such as simple washing or the like to give the desired iron-containing complex oxide powder.

The iron-containing complex oxide powder obtained by the present invention contains less agglomerates and has a narrow particle size distribution. The number average particle size of the iron-containing complex oxide powder is not specifically limited and usually about 0.1–300 μm. A D90/D10 ratio described hereinafter is preferably 10 or less, more preferably 5 or less.

According to the method of the present invention, it is possible to obtain an iron-containing complex oxide powder which is a homogeneous polyhedron containing less agglomerates and having a narrow particle size distribution and which has the above described feature and an average particle size of 10 μm or less, by selecting the kind and amount of the seed crystal added. The iron-containing complex oxide powder obtained in the present invention is suitably used as a raw material for a metal oxide ceramic to be used as a functional material or a structural material, a metal oxide powder to be used in a dispersed state such as a filler, pigment and the like, or a metal oxide powder to be used as a powdery material for producing a single crystal, a powdery material for flame spray and the like.

It is possible to obtain a powder of a single crystal of a polyhedron having an uniform particle size and shape, depending on the kind of the metal oxide powder used as the raw material.

Application examples of the resultant iron-containing complex oxide powder include magnetic recording material, electromagnetic wave absorbing material, magnetic recording head and the like.

EXAMPLES

The present invention will now be illustrated by means of the following Examples, which should not be construed as a limitation upon the scope of the invention.

In the Examples, the measurement of various properties of the metal oxide powder (iron-containing complex oxide powder) were conducted in the following way.

1. Number Average Particle Size of Metal Oxide Powder

A scanning electron micrograph of a metal oxide powder was taken using a scanning electron microscope (model T-300, manufactured by JOEL). From the micrograph, 80 to 100 particles were selected and image analyzed to calculate the mean of equivalent circle diameters of the particles and their distributions. The equivalent circle diameters referred to a diameter of a circle having the same area as that of a particle.

2. Particle Size Distribution of Metal Oxide Powder

The particle size distribution was measured using a master sizer (manufactured by Malvern Instrument, Inc.) based on the principle of laser scattering or a laser diffraction type particle size distribution analyzer (SALD-1100, manufactured by Shimadzu Corporation). The metal oxide powder was assayed by dispersing in an aqueous 0.5% sodium hexametaphosphate solution and the particle sizes at 10% accumulation, 50% accumulation and 90% accumulation from the side of the smallest particle size in a cumulative particle size distribution were taken as values D10, D50 and D90. The D50 value was used as the particle size of agglomerate.

3. Crystal Phase of Metal Oxide Powder

The crystal phase of the metal oxide powder was measured by an X-ray diffraction meter (RAD-C, manufactured by Rigaku Co., Ltd.).

4. BET Specific Surface Area of Metal Oxide Powder

The BET specific surface area of the metal oxide powder was measured by FLOWSORB-II (manufactured by Mictomelitics).

5. Composition Analysis of Metal Oxide Powder

After the metal oxide powder was dissolved in a mixed acid of phosphoric acid and sulfuric acid, the measurement was conducted using a high-frequency inductive coupling plasma apparatus SPS1200-VR manufactured by Seiko Co., Ltd.

A decomposition gas from ammonium iodide (special reagent grade, manufactured by Wako Pure Chemical Ind., Ltd.) was used as hydrogen iodide sources. An atmosphere gas was prepared by introducing a sublimation gas obtained by heating ammonium iodide above its sublimation temperature into a furnace core tube. Ammonium iodide was completely decomposed at 1100° C. to provide an atmosphere gas consisting of 25% by volume of hydrogen iodide gas, 16% by volume of nitrogen gas and 52% by volume of hydrogen gas and further 6% by volume of iodine (I, $I_2$) formed by decomposition of hydrogen iodide.

The metal oxide powder as the raw material was charged in an alumina or platinum vessel. The depth of the metal oxide powder charged was 5 mm.

The calcining was effected usually in a cylindrical furnace (manufactured by Motoyama Co., Ltd.) having a quartz muffle or an alumina muffle. Under a flow of the air or nitrogen gas, the temperature was raised at a heating rate within a range of 300° C./hour–500° C./hour and when the temperature reached a temperature for introducing an atmosphere gas, the produced atmosphere gas was sent out.

The concentration of the atmosphere gas was adjusted by controlling the flow rate of the gas by means of a flow meter. In all cases, the total pressure of the atmosphere gas was 1 atmosphere.

After the temperature reached the predetermined temperature, the material was maintained at that temperature for a predetermined period of time. They are referred to herein as maintaining temperature (calcining temperature) and maintaining time (calcining time), respectively. The desired metal oxide powder was obtained after passage of the predetermined maintaining time and air cooling.

The partial pressure of water vapor pressure was controlled by a change in saturation water vapor pressure at a temperature of water, and the water vapor was introduced into a calcining furnace with the aid of the air or nitrogen gas.

Example 1

After mixing 0.1 mol of barium carbonate (manufactured by Wako Pure Chemical Ind., Ltd.) and 0.6 mol of iron oxide powder (manufactured by Wako Pure Chemical Ind., Ltd.) in ethanol using a ball mill, the mixture was dried in a rotary evaporator to give a powder. This powder (1 g) was charged into a platinum vessel. Then, the vessel and ammonium iodide (1 g) charged in another boat were placed in a quartz muffle and, under a flow of air at a velocity of 20 ml/minute, they were heated at a heating rate of 600° C./hour from the room temperature to 1100° C., kept at that temperature for 60 minutes and then allowed to cool to give a powder.

Figure 2:
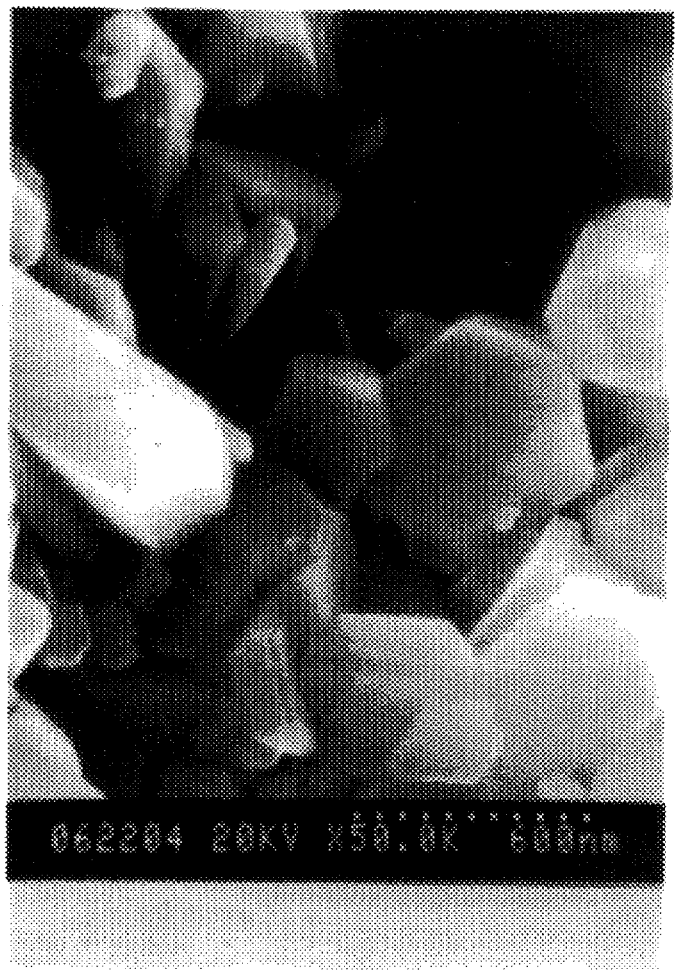
FIG. 2 is a scanning electron micrograph of powder obtained in Example 1.

The X-ray diffraction pattern of the obtained powder is shown in FIG. 1. As a result, the crystal form of the powder obtained in this Example was magnetoplumbite (barium ferrite) represented by $BaFe_{12}O_{19}$ and other peak was not observed. According to analysis by a scanning electron microscope, the obtained barium ferrite powder had a number average particle size of 0.3 μm. The scanning electron micrograph of the obtained barium ferrite powder is shown in FIG. 2.

Example 2

After mixing 0.1 mol of zinc oxide powder (manufactured by Wako Pure Chemical Ind., Ltd.) and 0.1 mol of iron hydroxide powder (manufactured by Wako Pure Chemical Ind., Ltd.) in ethanol using a ball mill, the mixture was dried in a rotary evaporator to give a powder. This powder (1 g) was charged into a platinum vessel.

Then, the vessel and ammonium bromide (1 g) charged in another boat were placed in a quartz muffle and, under a flow of air at a velocity of 20 ml/minute, they were heated at a heating rate of 600° C./hour from the room temperature to 900° C., kept at that temperature for 60 minutes and then allowed to cool to give a powder.

The obtained powder was analyzed by X-ray diffraction and found to be a spinel type oxide (zinc ferrite) represented by $ZnFe_2O_4$ and with no other peak. According to analysis by a scanning electron microscope, the obtained zinc ferrite powder had a number average particle size of 0.3 μm.

Comparative Example 1

The mixed powder (1 g) of barium carbonate and iron oxide used in Example 1 was charged into a platinum vessel.

Then, the vessel was placed in a quartz muffle and, under a flow of air at a velocity of 20 ml/minute, the vessel was heated at a heating rate of 600° C./hour from the room temperature to 1100° C., kept at that temperature for 60 minutes and then allowed to cool to give a powder.

The X-ray diffraction pattern of the obtained powder was analyzed. As a result, the crystal form of the powder obtained in this Comparative Example was magnetoplumbite (barium ferrite) represented by $BaFe_{12}O_{19}$. According to analysis by a scanning electron microscope, the obtained barium ferrite powder had a number average particle size of 0.3 μm. The scanning electron micrograph of the obtained barium ferrite powder was analyzed. As a result, no single crystal particle was observed.

Comparative Example 2

After mixing 0.1 mol of barium carbonate (manufactured by Wako Pure Chemical Ind., Ltd.) and 0.6 mol of iron oxide powder (manufactured by Wako Pure Chemical Ind., Ltd.) in ethanol using a ball mill, the mixture was dried in a rotary evaporator to give a powder. This powder (1 g) was charged into a platinum vessel.

Then, the vessel was placed in a quartz muffle and, under a flow of hydrogen chloride/air at a velocity of 10 ml/minute/10 ml/minute, the vessel was heated at a heating rate of 600° C./hour from the room temperature to 1100° C., kept at that temperature for 60 minutes and then allowed to cool to give a powder.

The obtained powder was analyzed by X-ray diffraction pattern. As a result, the obtained powder was a mixture of $BaCl_2$ and $\alpha\text{-}Fe_2O_3$ and formation of a compound represented by $BaFe_{12}O_{19}$ was not observed.

What is claimed is:

1. A method for producing an iron-containing complex oxide powder represented by the general formula:

$$XO.nFe_2O_3$$ 

wherein X represents one or more elements selected from the group consisting of Pb, Mg, Ca, Sr, Ba, Zn, Cu, Mn, Fe, Co and Ni and n represents an integer of 1 to 6, which comprises heating a mixture of an oxide of an X atom and iron oxide, or a mixture of a compound of the X atom and a compound of iron, which can be converted into the oxides, in an atmosphere gas containing at least one gas selected from a bromine gas, an iodine gas, a hydrogen bromide gas and a hydrogen iodide gas.

2. The method according to claim 1, wherein n of the general formula $XO.nFe_2O_3$ is 1 or 6.

3. The method according to claim 1, wherein the iron-containing complex oxide powder represented by the general formula $XO.nFe_2O_3$ comprises one or more solid solutions selected from magnetoplumbite type oxides represented by $BaFe_{12}O_{19}$, $PbFe_{12}O_{19}$, $CaFe_{12}O_{19}$ and $SrFe_{12}O_{19}$.

4. The method according to claim 1, wherein the iron-containing complex oxide powder represented by the general formula $XO.nFe_2O_3$ comprises one or more solid solutions selected from spinel type oxides represented by $ZnFe_2O_4$, $CuFe_2O_4$, $MnFe_2O_4$, $CoFe_2O_4$ and $NiFe_2O_4$.

5. The method according to claim 1, wherein a concentration of at least one gas selected from the bromine gas, the iodine gas, the hydrogen bromide gas and the hydrogen iodide gas in the atmosphere gas is 1% by volume or more.

6. The method according to claim 1, wherein a heating is performed within the range from 500° to 1500° C.

\* \* \* \* \*